No. 616,521. Patented Dec. 27, 1898.
A. BIRKICHT.
DEFLECTOR FOR STOVES.
(Application filed Feb. 24, 1898.)

(No Model.)

Witnesses
J. C. Shaw
Chas. E. Brock

Inventor
Adaline Birkicht,
by O'Mara & Co.
Attorneys

UNITED STATES PATENT OFFICE.

ADALINE BIRKICHT, OF ST. LOUIS, MISSOURI.

DEFLECTOR FOR STOVES.

SPECIFICATION forming part of Letters Patent No. 616,521, dated December 27, 1898.

Application filed February 24, 1898. Serial No. 671,467. (No model.)

*To all whom it may concern:*

Be it known that I, ADALINE BIRKICHT, residing at St. Louis, in the State of Missouri, have invented a new and useful Deflector for Stoves, of which the following is a specification.

My invention will be first fully described and afterward specifically pointed out in the claim.

In order to enable others skilled in the art to which my invention most nearly appertains to make and use the same, I will now proceed to describe its construction and operation, reference being had to the accompanying drawings, forming part of this specification, in which—

Figure 1:
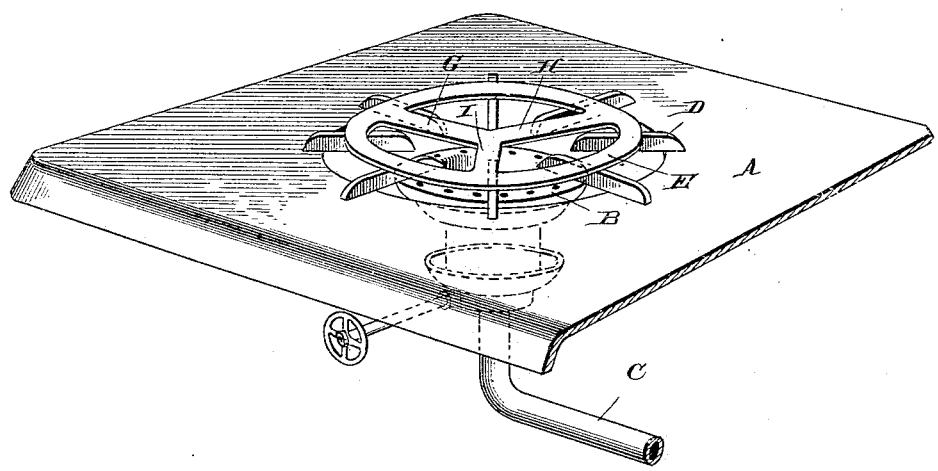
Figure 2:
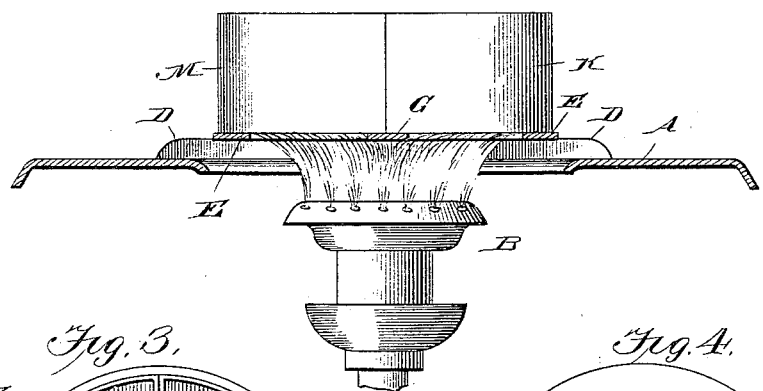
Figure 3:
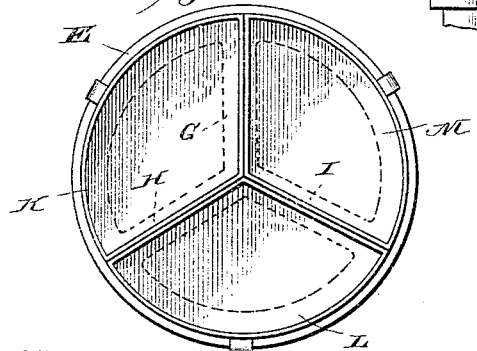
Figure 4:
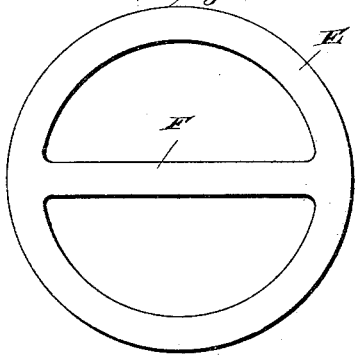

Figure 1 is a perspective view illustrating a portion of a stove with a deflector constructed according to my invention in place thereon.
Fig. 2 is a view, partly in vertical section and partly in elevation, of a stove with my improved deflector and cooking utensils thereon. Fig. 3 is a top plan view of a deflector constructed in accordance with my invention with three sector-shaped saucepans or cooking utensils thereon, the inner lines of the deflector being shown dotted. Fig. 4 is a top plan view of a deflector constructed in accordance with my invention for use with semicylindrical saucepans or cooking utensils.

Like letters of reference mark the same parts wherever they occur in the various figures of the drawings.

In the present illustration of my invention I have shown a portion A of a gasolene-stove provided with a burner B, supplied with fluid from a pipe C, all of these parts being of any usual or well-known construction and forming no part of my invention. The stove is also provided with the usual grate D over the burner-hole, upon which the saucepan or other cooking utensil is usually placed. In carrying out my invention, however, I provide a deflector to be placed upon the top of this grate, such deflector being composed of a flat circular plate or annulus E of a diameter somewhat less than that of the grate D, the sides of said annulus being connected by means of a diametric flat plate F, as shown in Fig. 4, or radial flat plates G, H, and I, as shown in Fig. 1, or any suitable number of such plates, according to the number of matched semicylindrical or sector-shaped saucepans or cooking utensils to be used thereon.

In Fig. 3 I have illustrated the annulus E with three radial connecting-plates G, H, and I, as in Fig. 1, and have shown superposed thereon three sector-shaped saucepans or cooking utensils K, L, and M. The application of my invention in this figure will be readily understood. In placing the saucepans or cooking utensils upon the deflector the lines upon which the inner radial sides of the saucepans join will meet over the radial connecting-plates G, H, and I, so that the flame arising from the burner will not at any point strike the lower inner edges of the saucepans or cooking utensils, but will be deflected laterally therefrom and have its greatest effect immediately upon the adjoining portions of the bottoms of the three sector-shaped saucepans or cooking utensils.

It will be noticed how two semicylindrical utensils could be used with the deflector illustrated in Fig. 4, the inner line of contact of the two utensils being immediately upon the diametric connecting-plate F. It will also be readily seen how any number of sector-shaped utensils, comprising in the aggregate a single cylindrical form when positioned together, may be used in connection with a deflector having a number of connecting radial flat plates corresponding with the number of sector-shaped utensils in the set.

The advantages of my invention will be readily understood by any one familiar with the use of such devices upon gas or gasolene stoves, the practical operation of which has shown that the principal objection to this very economical arrangement of cooking utensils has been that they burn out along their inner lines of contact, this result being due to the concentration of the heat upon these joints, owing to the slight space between the pans through which a draft is permitted. With my invention, which is extremely simple and cheap, this difficulty is entirely overcome and cooking utensils of this class are rendered still more economical and lasting. It will also be readily understood that while such utensils burn out much more quickly upon their lines of contact upon gas, gasolene, or other stoves the same defect exists to a certain extent when such utensils are used upon coal or wood stoves, and that, therefore, my invention is applicable to all kinds of stoves whereupon such cooking utensils are used.

Having thus fully described my invention, what I claim as new, and desire to secure by Letters Patent of the United States, is—

The combination with a stove having the usual fire-hole and a set of semicylindrical or sector-shaped cooking utensils placed thereon in position to form a cylindrical mass or nest, with an interposed deflector, consisting of an annular, flat plate of metal, having its sides connected by radially-arranged, flat bars of metal, in number equal to the number of utensils in the set and resting between the fire and the inner lines of contact of the utensils, substantially as described.

ADALINE BIRKICHT.

Witnesses:
BIRDIE M. SPENCE,
Mrs. M. F. GILLY.